(12) United States Patent
Berting et al.

(10) Patent No.: US 7,075,317 B2
(45) Date of Patent: Jul. 11, 2006

(54) SYSTEM AND METHOD FOR MEASUREMENT OF SMALL-ANGLE OR SMALL-DISPLACEMENT

(75) Inventors: John Berting, Wilmington, DE (US); Ron Garritano, Monroe Township, NJ (US)

(73) Assignee: Waters Investment Limited, New Castle, DE (US)

( * ) Notice: Subject to any disclaimer, the term of this patent is extended or adjusted under 35 U.S.C. 154(b) by 0 days.

(21) Appl. No.: 10/912,126

(22) Filed: Aug. 6, 2004

(65) Prior Publication Data

US 2006/0028215 A1 Feb. 9, 2006

(51) Int. Cl.
*G01R 27/26* (2006.01)

(52) U.S. Cl. ........................... 324/690; 324/662

(58) Field of Classification Search ............... 324/690, 324/660, 683, 662
See application file for complete search history.

(56) References Cited

U.S. PATENT DOCUMENTS

| | | | |
|---|---|---|---|
| 3,238,523 A | 3/1966 | Masel et al. | |
| 3,717,869 A | 2/1973 | Batz | |
| 3,766,544 A | 10/1973 | Batz | |
| 3,774,238 A | 11/1973 | Hardway, Jr. | |
| 4,238,781 A * | 12/1980 | Vercellotti et al. | 324/660 |
| 4,418,347 A | 11/1983 | Tanaka et al. | |
| 4,429,307 A | 1/1984 | Fortescue | |
| 4,477,810 A | 10/1984 | Tanaka et al. | |
| 4,563,683 A | 1/1986 | Tanaka et al. | |
| 4,631,524 A | 12/1986 | Brooke et al. | |
| 4,694,275 A | 9/1987 | Cox | |
| 4,743,902 A | 5/1988 | Andermo | |
| 4,864,295 A | 9/1989 | Rohr | |
| 4,878,013 A * | 10/1989 | Andermo | 324/690 |
| 4,879,552 A * | 11/1989 | Arai et al. | 340/870.37 |
| 4,882,536 A | 11/1989 | Meyer | |
| 4,959,615 A | 9/1990 | Andermo | |
| 4,972,725 A | 11/1990 | Choisent | |
| 5,028,875 A * | 7/1991 | Peters | 324/660 |
| 5,315,865 A | 5/1994 | Hornfeck et al. | |
| RE34,741 E | 9/1994 | Andermo | |
| 5,537,109 A * | 7/1996 | Dowd | 340/870.37 |
| 5,631,409 A * | 5/1997 | Rajagopal et al. | 73/54.35 |
| 5,657,006 A | 8/1997 | Kinoshita et al. | |

(Continued)

FOREIGN PATENT DOCUMENTS

EP 0 241 913 10/1987

(Continued)

OTHER PUBLICATIONS

International Search Report and Written Opinion (dated Jan. 20, 2006).

*Primary Examiner*—Anjan Deb
(74) *Attorney, Agent, or Firm*—Pillsbury Winthrop Shaw Pittman LLP

(57) ABSTRACT

A sensor for measurement of small-angle or small-displacement position incorporates multiple independent capacitors in a symmetric relationship. The device presents its output as a standard bridge configured differential signal, which can be interpreted and measured using conventional electronic demodulation means. The device includes an excitation array, a measurement array and an active rotor or linear array. The active array is coupled to a moving object and measured relative to the measurement and excitation arrays. The active array may be floating, grounded or driven by an electrical signal. However, driving the active array with signals sensed by the measurement array allows for reduced sensitivity to unwanted signals not in the measurement direction.

70 Claims, 12 Drawing Sheets

U.S. PATENT DOCUMENTS

| | | | |
|---|---|---|---|
| 5,691,646 A | 11/1997 | Sasaki | |
| 5,731,707 A * | 3/1998 | Andermo | 324/660 |
| 6,118,283 A * | 9/2000 | Cripe | 324/660 |
| 6,492,911 B1 | 12/2002 | Netzer | |
| 2004/0046548 A1* | 3/2004 | Pettersson et al. | 324/207.17 |

FOREIGN PATENT DOCUMENTS

| | | |
|---|---|---|
| JP | 60088314 | 5/1985 |
| JP | 03061816 | 3/1991 |
| JP | 05264291 | 10/1993 |

* cited by examiner

SYSTEM AND METHOD FOR MEASUREMENT OF SMALL-ANGLE OR SMALL-DISPLACEMENT

BACKGROUND

1. Field of the Invention

The present invention relates generally to measuring devices for making linear and angular measurements. More particularly, it relates to measurement of small-angle or small displacement position using capacitive measurement techniques, while exhibiting a reduced sensitivity to motions that are not in the direction or axis of the desired measurement.

2. Background of the Invention

Numerous capacitance-type measuring devices for making linear and angular measurements have been developed. For example, U.S. Pat. No. 4,972,725 to Choisnet describes a capacitive sensor of a torsion angle and a torque or moment measuring instrument provided with a sensor. Similarly, U.S. Pat. No. 5,657,006 to Kinoshita et al. describes a rotation angle sensor that detects a rotation angle by amounts of changes in electrostatic capacitance.

Kinoshita et al. disclose in its FIG. 1 a sensor having two fixed plate electrodes, which are opposed to each other, and a rotational plate inserted between the two fixed electrodes. The first fixed electrode is split into two members, each member having a semicircular shape and the members not conducting with each other. The second fixed electrode is split into two members, each member having a semicircular shape and the members not conducting with each other. Finally, the rotational plate electrode is also split into two members, each member having a semicircular shape and the members not conducting with each other. The rotational plate split members are bonded to the shaft. The first fixed electrode emits a signal that is measured by the second fixed electrode via capacitance. Particularly, the rotational plate acts as a shield changing the capacitance valued measured by the second fixed electrode members.

For example, in Kinoshita's sensor, the shaft is rotated in correspondence to a rotation angle to be detected. In response to this rotation of the shaft, the rotational plate rotates to form electrostatic capacitances between the first member of the first fixed electrode and the first member of the second fixed electrode, between the first member of the first fixed electrode and the second member of the second fixed electrode, between the second member of the first fixed electrode and the first member of the second fixed electrode, and between the second member of the first fixed electrode and the second member of the second fixed electrode. The differential capacitance between the two members of the second electrode changes as the rotational plate overlaps different portions of the members, allowing an angular position of the plate to be detected.

Having only two members in each plate allows the angle sensor to operate over a large range of motion. Indeed, these and other conventional angle sensors are designed for wide angle positioning over a large range of operation. As such, their resolution and gain errors due to motion in the non-measuring direction are unsuitable for use in small angle measurement devices.

As suggested above, gain error often occurs in traditional capacitive angle sensors due to non-angular displacement. For example, as temperature increases, a member of the rotating electrode typically shifts to a member in one of the fixed electrode plates. Such small movement in the non-axial direction will be inaccurately reported by the sensor as a change in the angular direction. Particularly, because the rotor elements of an active rotor array have conductive surfaces, motion of the rotary electrode that is not along the primary measurement path can introduce additional capacitances that are parasitic to the function of the sensor, causing an error in gain and a reduced sensitivity that is unsuitable for small angle measurement.

In conventional angle measurement sensors, the rotating or movable electrode of an array system is attached to ground or is left floating. FIGS. 1 and 2 describe the resulting parasitic configurations in a conventional array, such as the array of Kinoshita et al. described above, for both arrangements of the rotating electrode plate.

FIG. 1 is a schematic diagram of a capacitive bridge 100 formed by elements of a conventional angle sensor when the rotating plate is electrically isolated and floating. The bridge includes nodes A to D and capacitors AC 110, AD 120, BD 130, BC 140, AE 150, BE 160, CE 170 and DE 180.

Node A represents the first member of the first fixed electrode. Similarly, node B represents the second member of the first fixed electrode. Node C represents the first member of the second fixed electrode. Finally, node D represents the second member of the second fixed electrode.

Capacitors AC 110, AD 120, BD 130 and BC 140 represent the various capacitances formed between each node, as discussed above. For example, AC 110 represents the capacitance between nodes A and C. AD 120 represents the capacitance between nodes A and D. BD 130 represents the capacitance between nodes B and D, and BC 140 represents the capacitance between nodes B and D.

Finally, effective capacitors AE 150, BE 160, CE 170 and DE 180 represent each of the capacitances formed between each of the nodes and node E, a floating point. The four capacitors AE 150, BE 160, CE 170 and DE 180 form an effective AC grounding point at node E. When the rotating electrode experiences an axial shift, the values of capacitors AE 150 and BE 160 increase, while the values of capacitors CE 170 and DE 180 decrease.

Nodes A and B, representative of members of a first fixed electrode that emits a signal to the second fixed electrode, are typically low impedance, and will remain relatively unaffected by changes to capacitors AE 150 and BE 160. However, nodes C and D, representative of members of a second fixed electrode that measures capacitance, are high-impedance nodes that are extremely sensitive to capacitive loading. Hence, the variable capacitive load of capacitors CE 170 and DE 180 causes a gain change in the bridge due to loading effects.

FIG. 2 is a schematic diagram of a capacitive bridge formed by the elements of a conventional angle sensor when the rotating plate is grounded. Similar to FIG. 1, the bridge includes nodes A to D and capacitors AC 110, AD 120, BD 130, and BC 140. In addition, the bridge includes capacitors AG 210, BG 220, CG 230 and DG 240 connected between each of the nodes and ground. The system shown in FIG. 2 is simpler than FIG. 1, but the net result is the same. If the rotor changes axial position, this is reported as a gain change in the bridge measurement.

Another challenge in obtaining accurate, linear, stable and repeatable results in a position sensor that operates over a small range of motion with a high resolution of position lies with the limited range of capacitive rotary sensors. Capacitive rotary sensors typically have somewhat less than one-half of one rotation of full-scale range, thereby limiting accuracy and resolution during small angle measurements of microradians of motion or smaller.

Yet another challenge with capacitive sensors lies with the non-linear position signal produced by plate type capacitive sensors used for linear positioning. In plate-type sensors where the gap of the capacitor is varied to effect capacitance, the position signal is not typically linear, and must be corrected to produce a linear signal.

Thus, it is desirable to create small-angle or small-displacement capacitive sensors that have greatly reduced sensitivity to typical sources of mechanical positioning error. Some applications for such sensors include a motor position sensor for a linear or rotary actuator with a small range of motion. For example, a magnetic or piezo motor may include such a sensor. Other applications include a linear or rotary sensor used with a mechanical spring for measuring force or torque, a sensor in a position servo having a magnetic motor as a magnetic force sensor, and a sensor for measurement of position in micro-positioning X/Y or rotary platform. More particularly, a rheology, weighing or other load cell application may use the sensor in construction of force or torque sensor. An atomic force microscopy application may use the sensor for position control or force measurement. Finally, a small motion mechanical servo system may use the sensor in a precision position indicator.

BRIEF SUMMARY OF THE INVENTION

A device according to the present invention includes three components: an excitation array, an active rotor or linear (rotor/linear) array, and a measurement array. The active rotor/linear array is positioned between the measurement and excitation arrays. The position of the active rotor/linear array element is measured relative to the measurement and excitation arrays. Particularly, the measurement array senses a signal from the excitation array, which is affected as the active rotor/linear array moves from side to side.

In one embodiment of the invention, sensitivity may be increased by using a plurality of elements in each array of the device. For example, the excitation array may have a plurality of first emitters and a plurality of second emitters. Each first emitter emits a first sinusoidal signal, and each second emitter emits a second sinusoidal signal, with the second sinusoidal signal out of phase with the first sinusoidal signal.

Similarly, the measurement array has a plurality of first detectors and a plurality of second detectors. Each first detector senses a first voltage of the first sinusoidal signal and the second sinusoidal signal, and each second detector senses a second voltage of the first sinusoidal signal and the second sinusoidal signal. Likewise, the active rotor/linear array has a plurality of movable electrodes, wherein movement of the plurality of movable electrodes varies the first voltage and the second voltage sensed by the measurement array.

In a preferred embodiment of the present invention, each array (e.g., the excitation array, measurement array, and active rotor/linear array) uses fifty blades, increasing the resulting sensitivity by a factor of twenty-five.

In another embodiment of the invention, the active rotor/linear array is driven by the voltages sensed by the measurement array. Driving the active array with the voltages of the measurement array causes rejection of unwanted signals that are not in the measurement direction. Thus, for angular measurement, axial motion of an active rotor does not result in an amplitude change in the differential output signal. Lateral translation of an active rotor does not simulate an angle change due to cancellation by the plurality of elements caused by the averaging of all elements in the measurement array.

The present invention may be applied to capacitive angle measurement sensors or capacitive linear measurement sensors. Angle sensors employ an active rotor array, whereas linear sensors employ a linear array. Multiple capacitive elements of the sensor that combine into a single composite measurement provide increased sensitivity. Similarly, driving the active array with voltages from the measurement array results in reduced sensitivity to other mechanical motions that are not in the direction of measurement. The invention may be used in any application in which small angles or small distances are measured. However, the invention is particularly suited for rheometry or rheology applications.

DETAILED DESCRIPTION OF THE INVENTION

A device according to the present invention includes three components: an excitation array, an active rotor or linear (rotor/linear) array, and a measurement array. The active rotor/linear array is positioned between the measurement and excitation arrays. The position of the active rotor/linear array element is measured relative to the measurement and excitation arrays. Particularly, the measurement array senses a signal from the excitation array, which is affected as the active rotor/linear array moves from side to side.

For angular measurement, when the active rotor is turned relative to the excitation and measurement arrays, a signal is produced on the measurement array that is proportional to the change in angular position. Changes to the position of the active rotor that are not angular in nature produce greatly reduced output signal changes. For example, axial motion of the active rotor does not result in an amplitude change in the differential output signal. Similarly, due to the plurality of elements, lateral translation of the active rotor does not simulate an angle change.

For linear measurement, unwanted signals not in the measurement direction may be rejected in a similar fashion.

Figure 3:
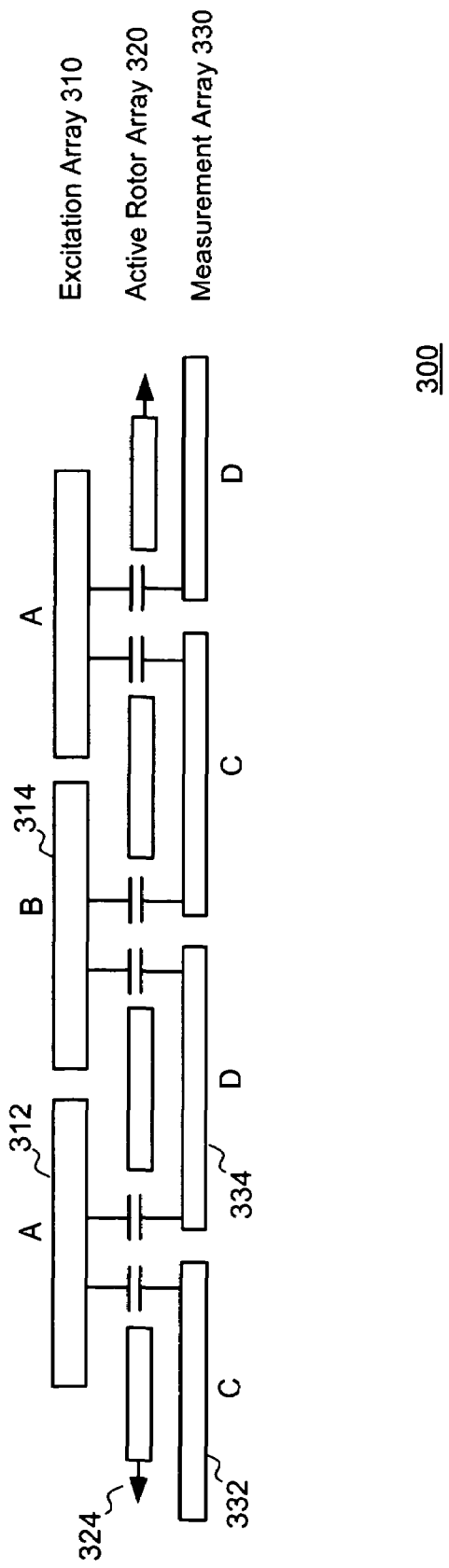
FIG. 3 is a cutaway view of a small portion of a measurement device according to a preferred embodiment of the present invention.

FIG. 3 is a cutaway view of a small portion of a small angle measurement device according to a preferred embodiment of the present invention. Measurement device 300 comprises an excitation array 310, an active rotor array 320 and a measurement array 330. Active rotor array 320 (e.g., movable guard array or movable guard shading array) is positioned between excitation array 310 and measurement array 330. Each array of the measurement device 300 (i.e., excitation array 310, active rotor array 320 and measurement array 330) has a plurality of elements or conductive areas.

In a preferred embodiment of the invention, measurement device 300 operates with a maximum linear range of plus or minus 20 milliradians (mRad), which is used for a 3.5 to 5.0 mRad transducer. Measurement device 300 has an outer diameter of three inches for the assembly using PC board technology. More particularly, each array has a clear hole with a minimum diameter of 1.0 inches for a hub and wiring. In a preferred embodiment, the clear hole is 1.5 inches. Additionally, each array has an outer diameter of 2.5 inches.

Excitation array 310 is the electrically driven element of the measurement device 300. Particularly, excitation array 310 provides a sinusoidal signal to measurement array 330. Emitter A 312 and emitter B 314, elements of excitation array 310, emit sine signals that are 180 degrees out-of-phase.

Active rotor array 320 is a conductive element of the measurement device 300 used as a shadowing element to block the electrostatic field generated by excitation array 310. Arrows 324 indicate the side-to-side motion of active rotor array 320 in the desired axis of measurement. For position determination, active rotor array 320 is mechanically coupled to a moving part, such as a shaft, whose motion is being measured. Active rotor array 320 is floating or grounded.

Measurement array 330 senses a signal from excitation array 310, which is transferred by a capacitive coupling across the gap between the two arrays. The elements of measurement array 330 include detector C 332 and detector D 334.

Figure 4A:
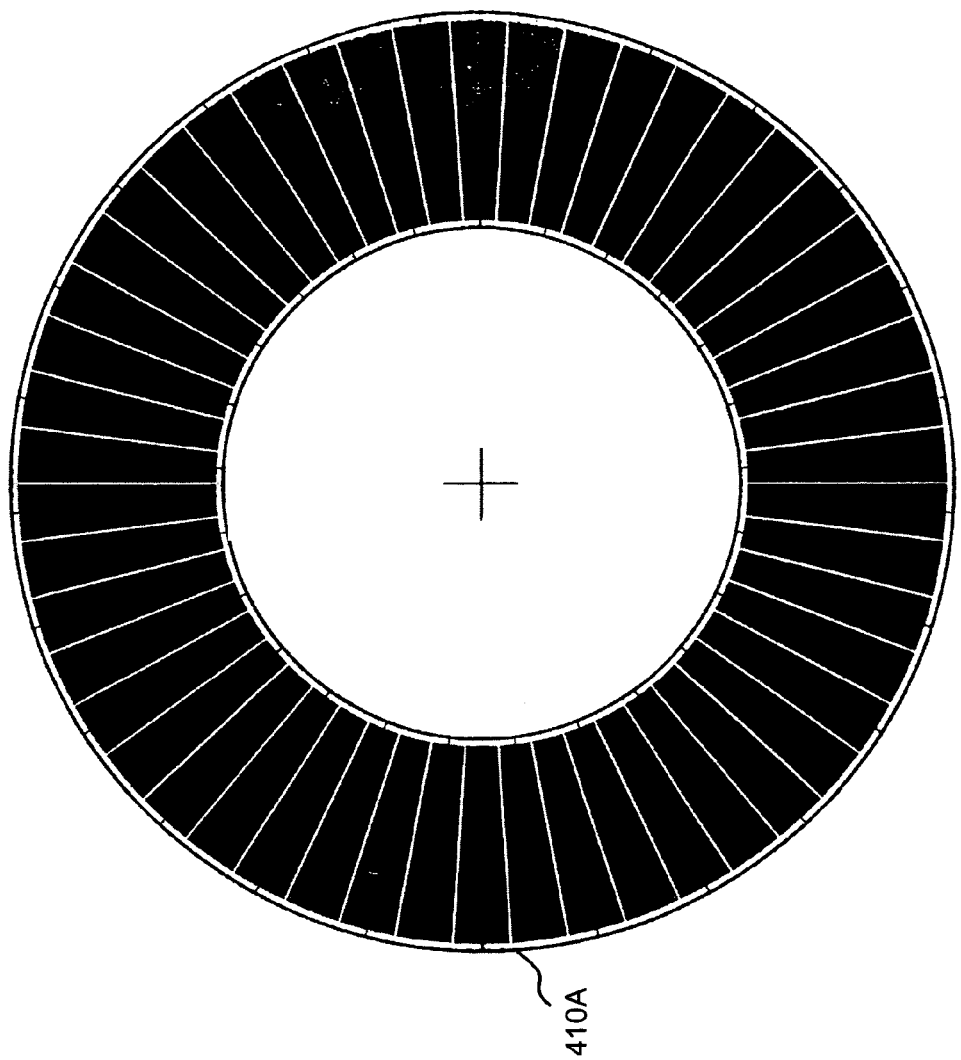
FIGS. 4A, 4B and 4C are schematic diagrams of an exemplary excitation array, an exemplary active rotor array and an exemplary measurement array, respectively according to a preferred embodiment of the present invention.
Figure 4B:
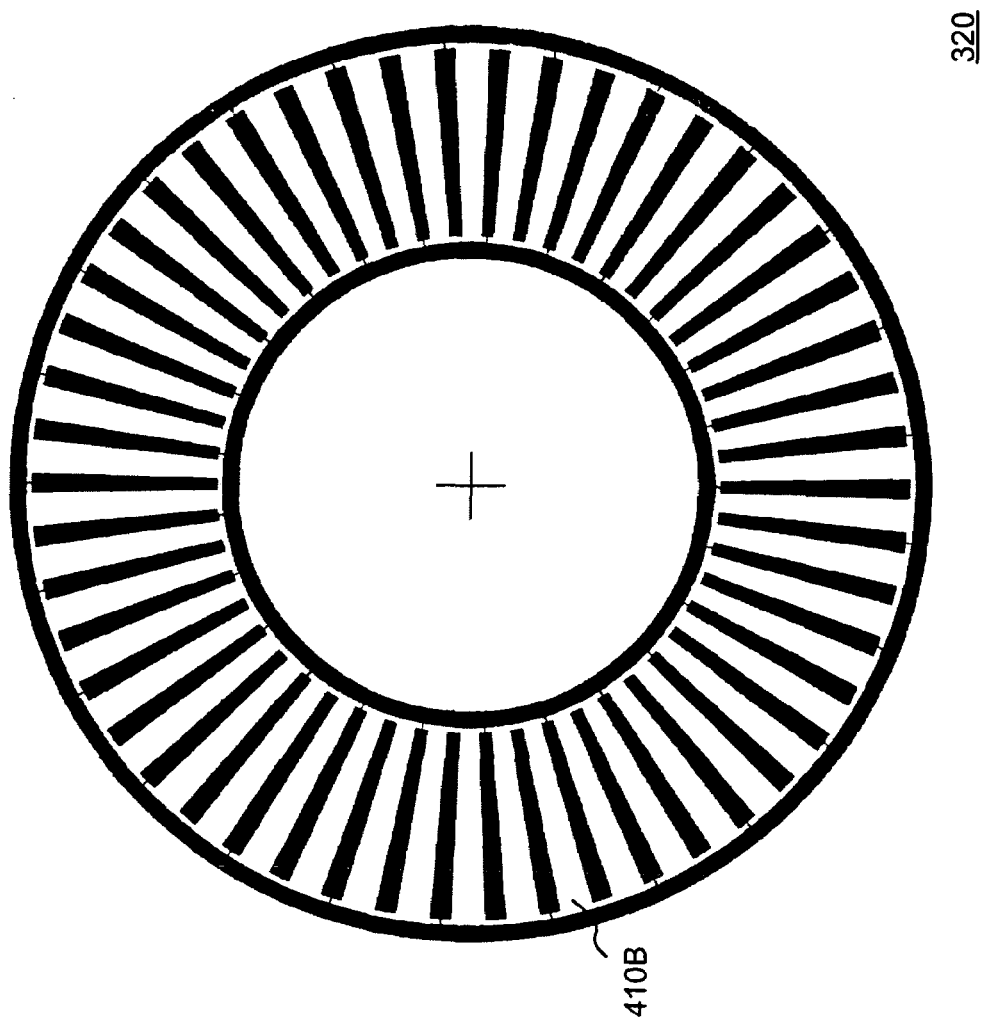
Figure 4C:
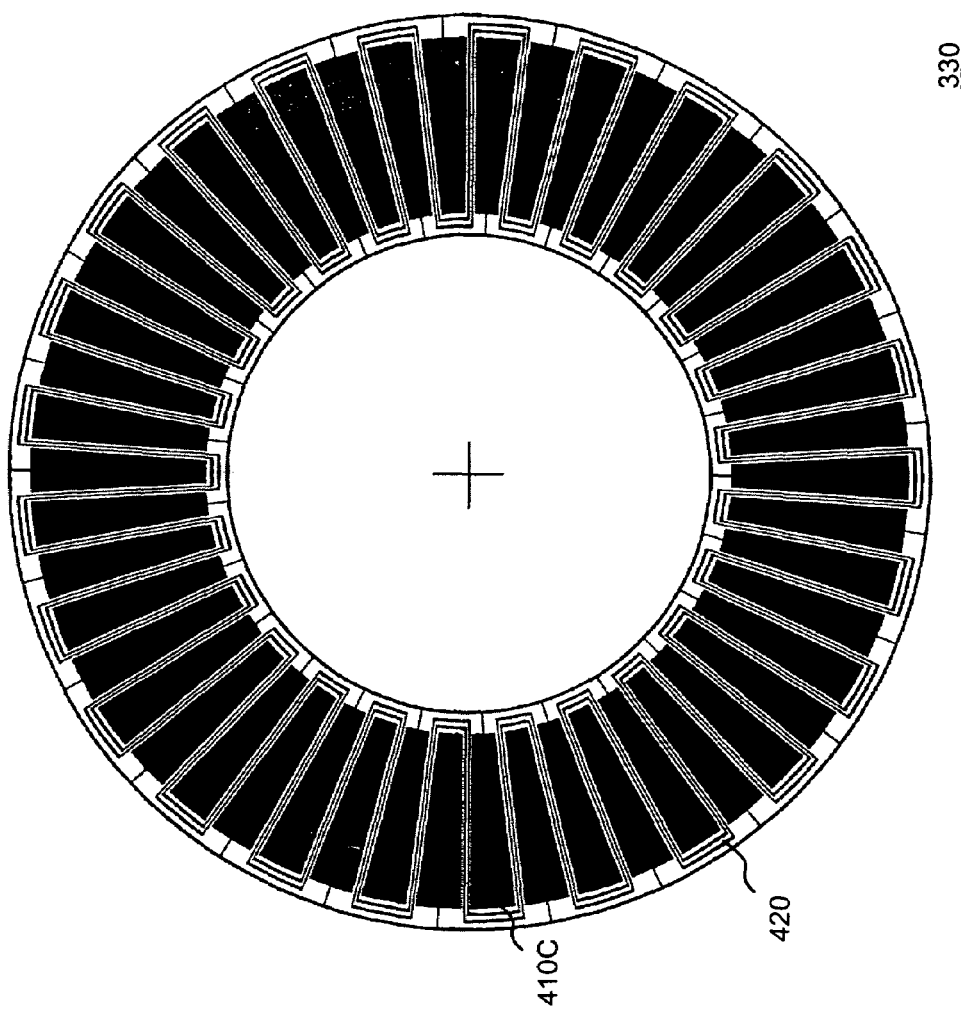

FIGS. 4A, 4B and 4C are schematic diagrams of excitation array 310, active rotor array 320 and measurement array 330, respectively according to a preferred embodiment of the present invention. In the example illustrated in these figures, excitation array 310, active rotor array 320 and measurement array 330 each have 50 elements or conductive areas called blades 410A, 410B and 410C. Each blade measures 0.1256637 radians. Blades 410C of measurement array 330 have two traces or double guards 420, which are described in more detail with reference to FIG. 6. The trace width and spacing between the blades is 0.005 inches.

Although the illustrative example discloses the use of 50 blades, one skilled in the art will recognize that the present invention is not limited as such. For example, in another embodiment, only 20 blades per array may be used, forming 10 bridge elements. Alternatively, using thin-film and other small geometry fabrication methods, arrays with a greater density than 25 bridge elements (50 blades) can be achieved.

In the embodiment described herein, the use of 50 blades increases the resulting sensitivity by a factor of 25. Particularly, the capacitive elements of excitation array 310 and measurement array 330 form a capacitive bridge, described below in reference to FIG. 5, comprising the following nodes: emitter A, emitter B, detector C and detector D. The use of 50 excitation and measurement blades results in 25 such bridges composed of 100 capacitors.

Figure 5:
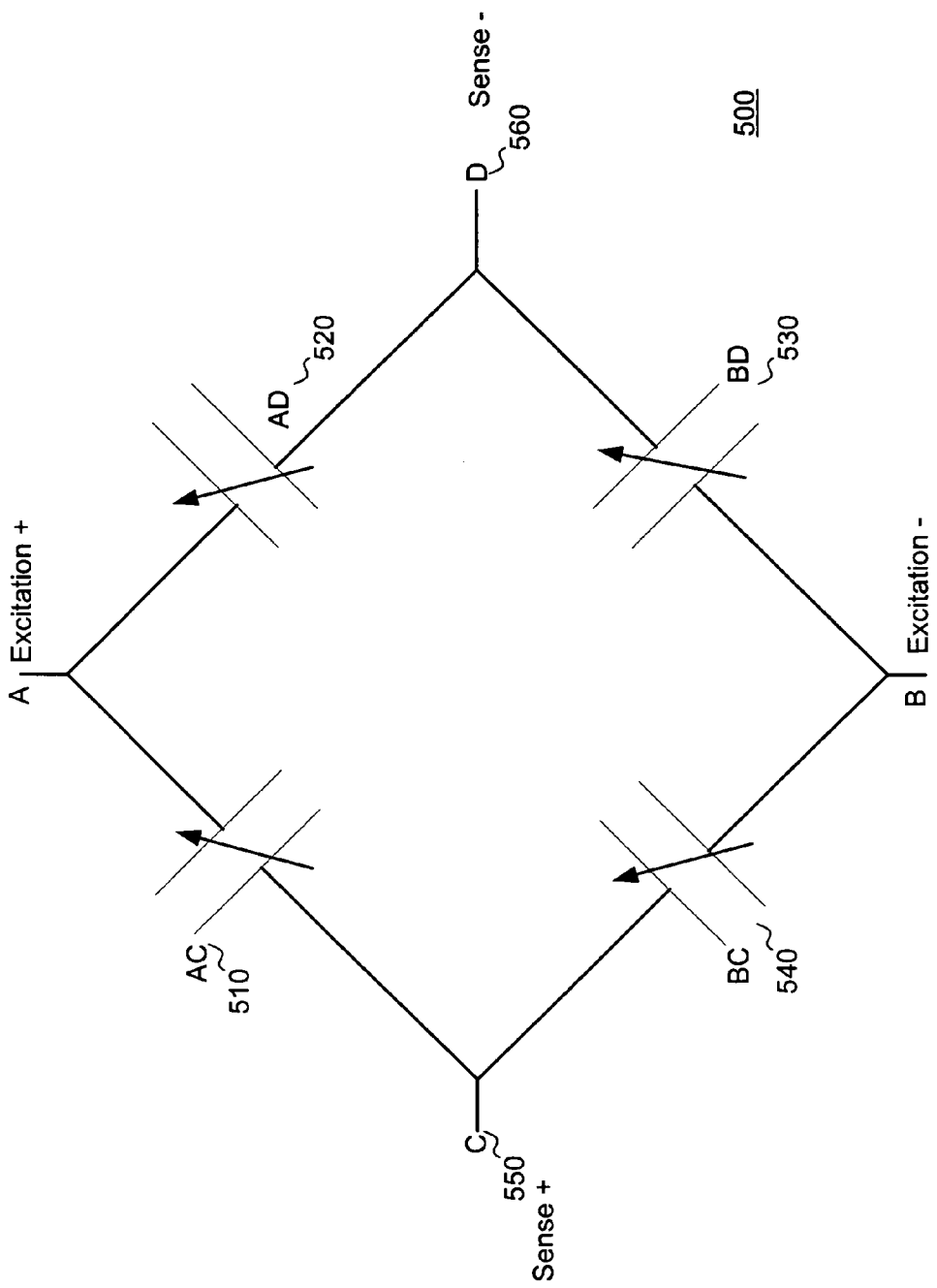
FIG. 5 is a schematic diagram of a capacitive bridge formed by the elements of the measurement device, according to a second preferred embodiment of the present invention.

FIG. 5 is a schematic diagram of a capacitive bridge formed by the elements of the measurement device according a second preferred embodiment of the present invention. Capacitive bridge 500 includes variable capacitors AC 510, AD 520, BD 530 and BC 540, sense point C 550 and sense point D 560. Variable capacitor AC 510 represents the capacitance between emitter A 312 and detector C 332 of FIG. 3. Similarly, variable capacitor AD 520 represents the capacitance between emitter A 312 and detector D 334. Variable capacitor BD 530 represents the capacitance between emitter B 314 and detector D 334, and variable capacitor BC 540 represents the capacitance between emitter B 314 and detector C 332. Each of the capacitors AC 510, AD 520, BD 530 and BC 540 are described as variable because their capacitance values vary with the movement of active rotor array 320.

For example, if active rotor array 320 of FIG. 3 moves to the left, then the elements of rotor array provide less shadowing between detector C 332 and emitter A and less shadowing between detector D and emitter B. Because shadowing is reduced by movement of active rotor array 320 to the left, detector C 332 receives greater exposure to emitter A 312 and detector D 334 receives greater exposure to emitter B 314. Accordingly, moving active rotor array 320 of FIG. 3 to the left increases the capacitance of capacitor AC 510 and BD 530, by increasing the effective surface area of the capacitive elements (i.e., the portion of the emitter and detector elements that are not shaded by the conductive rotor elements).

Similarly, moving active rotor array 320 of FIG. 3 to the left increases the shadowing provided by active rotor array 320 between emitter A 312 and detector D 334 as well as between emitter B 314 and element C 332. Accordingly, moving active rotor array 320 of FIG. 3 to the left decreases the capacitance of capacitor AD 520 and BC 540.

Returning to FIG. 5, as active rotor 320 moves to the left, bridge capacitors AC 510 and BD 530 increase in capacitance while bridge capacitors AD 520 and BD 540 decrease a proportional value in capacitance. The change in capacitance values of the bridge capacitors 510, 520, 530 and 540 causes bridge 500 to become unbalanced. Sense points C 550 and D 560 detect the differential signal of the unbalanced bridge 500. Further, the variation of capacitance is linear with respect to the horizontal displacement of the effective surface area of the various capacitive elements changes linearly.

More particularly, each change in capacitance is directly and linearly proportional to the change in position of the moveable element. Therefore, the amplitude of the differential voltage output by the measurement array is directly and linearly proportional to the change in position of the moveable element. This linear proportionality is in contrast to changes of capacitance caused by changes in the gap between plates, which is not linear with position.

The capacitive bridge configuration formed by the various physical elements of FIG. 3 increases the sensitivity of the system to capacitance changes by a factor of four. The use of multiple bridges multiplies the sensitivity of measurement device 300 by the number of array elements used. Particularly, as described above in reference to FIGS. 4A, 4B and 4C, the inventors of the present invention in a prototype of this design used 50 blades for each array in the measurement device (i.e., excitation, active rotor and measurement arrays), resulting in 25 bridge elements composed of 100 capacitors connected in an array. Thus, the resulting sensitivity is multiplied by a factor of 25 in an exemplary embodiment of the invention.

Although using more array elements increases the sensitivity of the measuring device, it also decreases its full-scale angular or linear range. For example, if a single-capacitor rotary position sensor has a maximum full-scale range of 180 degrees, then an array of 25 bridge elements is reduced to a maximum full-scale range of 7.2 degrees (e.g., 180/25=7.2). However, physical limitations of fabrication size, alignment, the gap between plates, edge effects and other necessary design compromises limit the range of the sensor even further than the theoretical 7.2 degrees maximum full-scale range.

Figure 1:
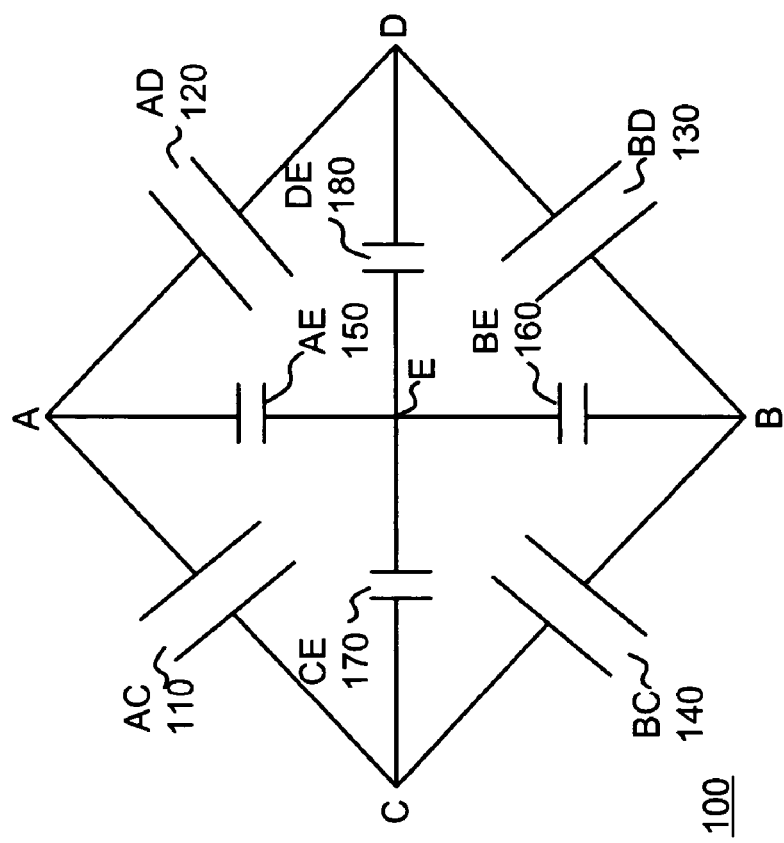
FIG. 1 is a schematic diagram of a capacitive bridge formed by elements of a conventional angle sensor when the rotating plate is electrically isolated and floating.
Figure 2:
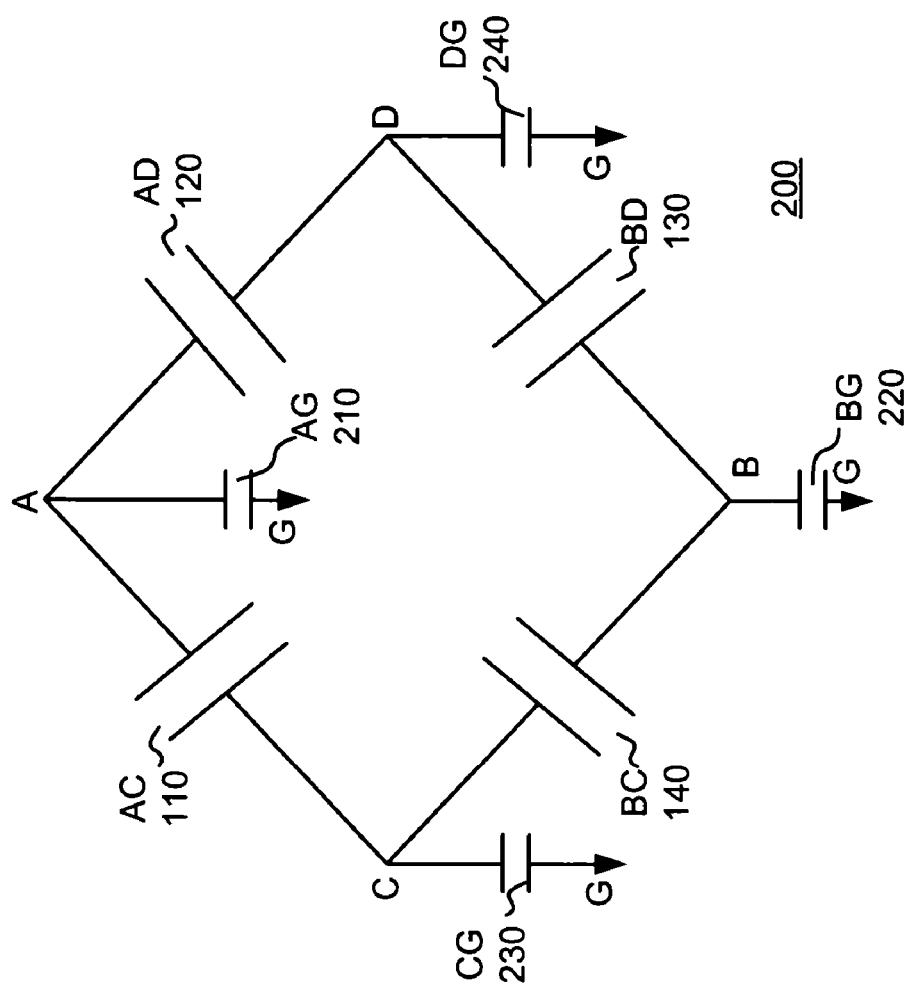
FIG. 2 is a schematic diagram of a capacitive bridge formed by the elements of a conventional angle sensor when the rotating plate is grounded.

The embodiment depicted in FIGS. 3 and 4A–4C, comprising 50 blades per array, achieves small angle measurement of plus or minus 20 mRad in limited range applications of 5 mRad or less. However, as described above, the active rotor array 320 of FIG. 3 may be floating or grounded. When the active rotor array 320 is floating or grounded, gain error occurs due to movement in the non-measuring direction, as described above with reference to FIGS. 1 and 2. For example, motion of the rotary electrode that is not along the primary measurement path can introduce additional capacitances that are parasitic to the function of the sensor, causing an error in gain and a reduced sensitivity.

Accordingly, a second preferred embodiment of the invention, reduces the parasitic capacitance introduced by movement in the non-measuring direction by driving the active rotor array with an electric signal.

Figure 6:
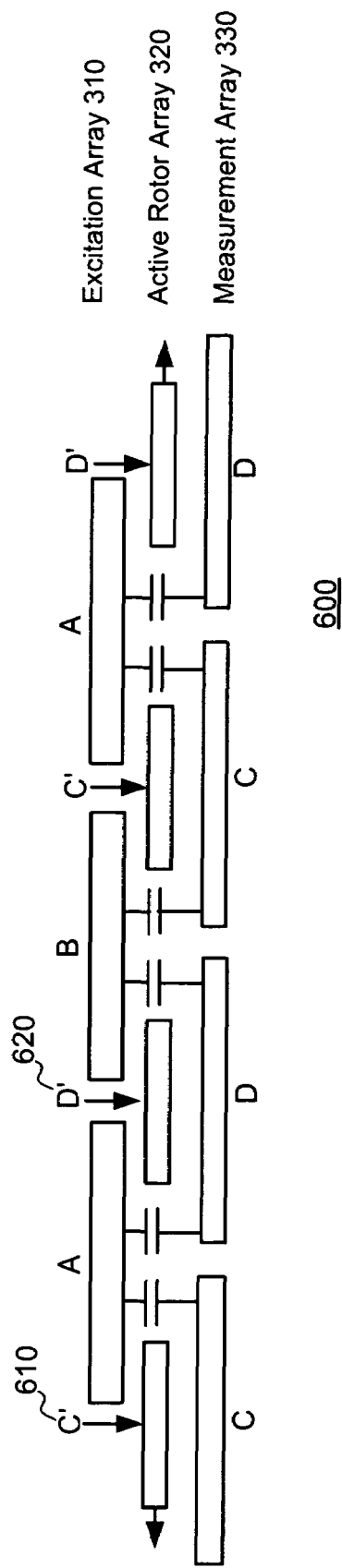
FIG. 6 is a cutaway view of a small portion of a measurement device according to the second preferred embodiment of the present invention.

FIG. 6 is a cutaway view of a small portion of a measurement device according to the second preferred embodiment of the present invention. Measurement device 600 differs from measurement device 300 of FIG. 3 in that active rotor array 320 includes elements or nodes, C' 610 and D' 620, representing new signals that drive the active rotor array. Nodes C' 610 and D' 620 are low impedance sources precisely matched to the signals appearing on nodes C and D. Buffer amplifiers are connected to nodes C and D to drive the C' and D' signals, respectively. FIG. 4C shows double traces around nodes C and D that supply the C' and D' signals from nodes C and D to the active rotor array.

Figure 7:
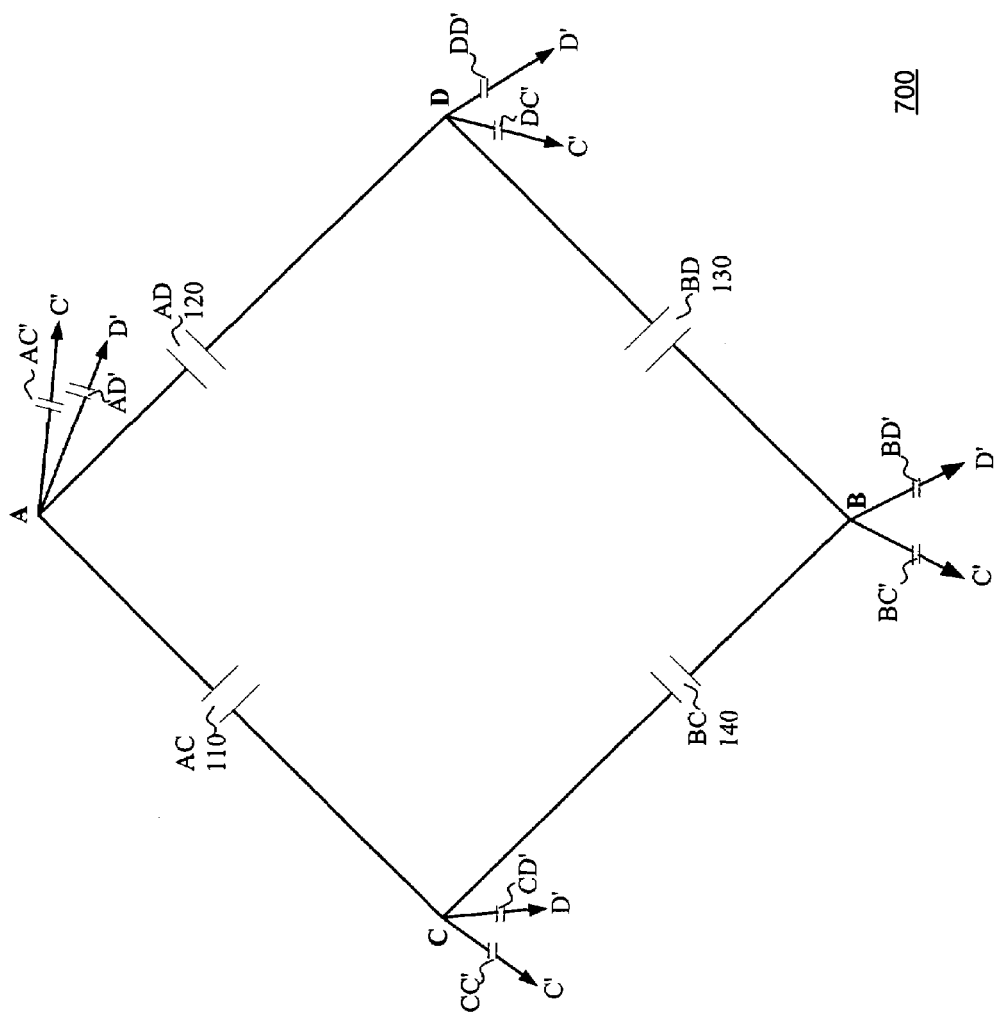
FIG. 7 is a schematic diagram of a capacitive bridge 700 formed by the elements of the measurement device, according to a preferred embodiment of the present invention.

To more fully understand how signals C' and D' reduce gain error, consider their effect in a capacitance bridge. FIG. 7 is a schematic diagram of a capacitive bridge 700 formed by the elements of measurement device 600 according a preferred embodiment of the present invention. The parasitic capacitances formed by the arrangement of FIG. 6 include AC', AD', BC', BD', CC', CD', DC' and DD'. As described in reference to FIGS. 1, 2 and 6, the A, B, C' and D' nodes are emitter elements, which are low-impedance sources that remain relatively unaffected by any change of capacitance. Thus, although parasitic capacitances AC', AD', BC' and BD' are real capacitances that are affected by gap distance, any change in these capacitances will leave nodes A, B, C' and D' relatively unaffected.

Parasitic capacitances CC' and DD' are effectively zero. Because node D' is driven from node D, the two sources have the same potential voltage at all times. Thus, the capacitance DD' between node D and D' is effectively zero. The same protection exists between nodes C and C', resulting in a zero capacitance. The effective zero value for these two capacitors is not changed in any way by the gap between the two electrodes. Because these capacitances are normally the source of gain errors in the bridge, this source of error is effectively eliminated from the measurement. This technique is typically referred to as an electrostatic guarding technique.

Finally, parasitic capacitances CD' and DC' are also minimized by their placement in the system. Particularly, the CD' and DC' capacitance is minimized by placing nodes C' 610 and D' 620 below the center of nodes C and D, respectively. Thus, even when active rotor array moves to the left or right the amount of any overlap between nodes C and D' or between nodes C' and D is minimized. That is, by placing C' 610 and D' 620 away from nodes D and C, respectively, as well as using guard elements in the design, parasitic capacitances CD' and DC' are held close to zero and considered negligible.

Accordingly, using the described multiple bridge technique and capacitive guarding of rotor elements, it is possible to fabricate a highly precise small-angle capacitive position sensor that is relatively insensitive to non-measurement-axis motions. Using traditional printed circuit board techniques, it is possible to achieve an array of 25 elements in a reasonable operating diameter. As described above, higher density arrays can be achieved using thin-film and other small geometry fabrication methods.

Figure 8:
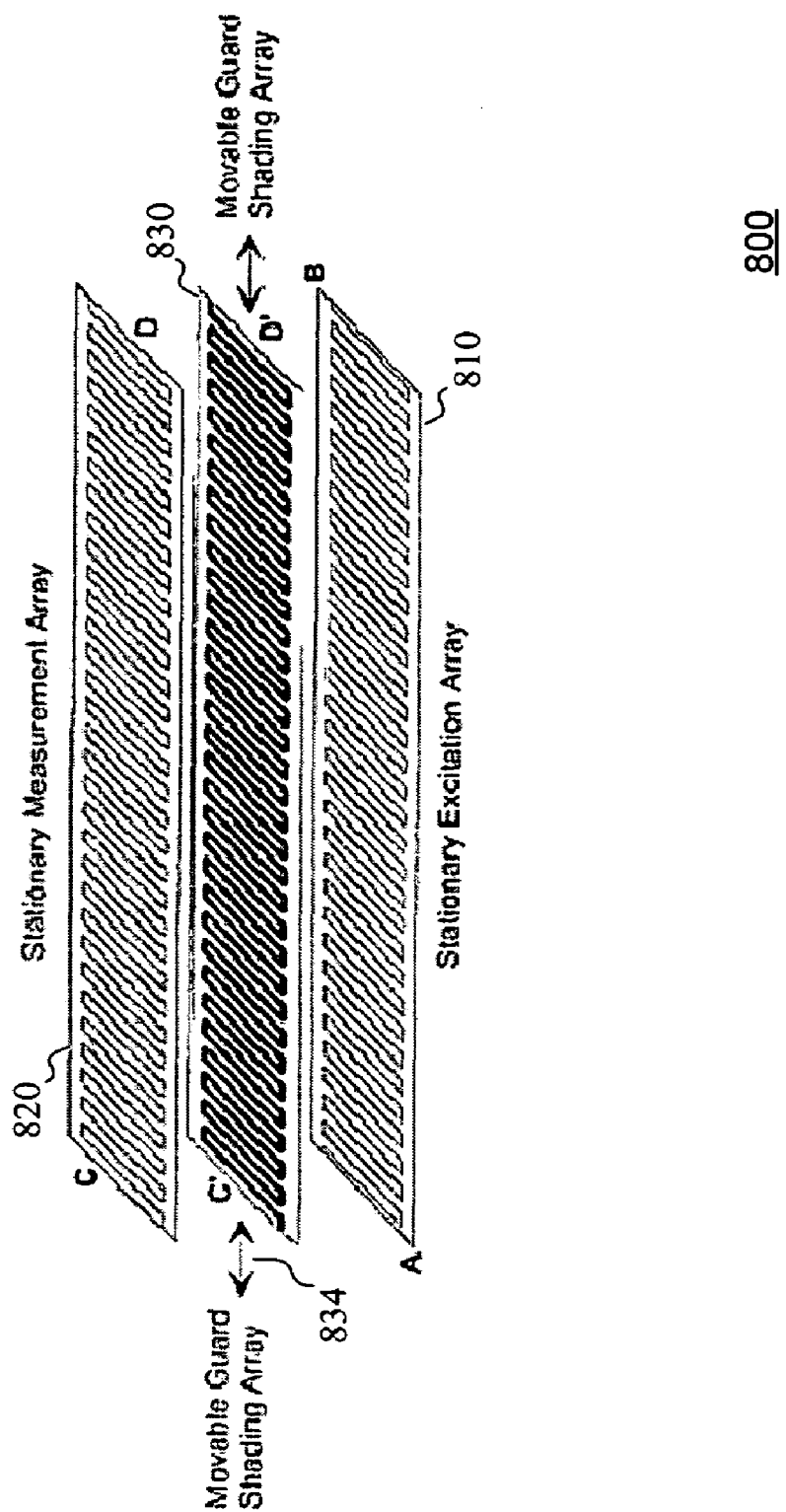
FIG. 8 is a schematic diagram of an excitation array, movable guard shading array and a measurement array in a linear motion capacitive sensing array, according to a third preferred embodiment of the present invention.

Although the present invention was described above in relation to angle measurements, the same techniques may be applied in linear measurements. FIG. 8 is a schematic diagram of an excitation array, movable guard shading array and a measurement array in a linear motion capacitive sensing array, according to a third preferred embodiment of the present invention. Particularly, FIG. 8 is similar to the second embodiment described in reference to FIG. 6, except that it refers to a linear motion capacitive sensing array instead of an angle measurement array.

Accordingly, measurement device 800 includes a stationary excitation array 810, a stationary measurement array 820 and a movable guard shading array 830. Movable guard shading array 830 is positioned between excitation array 810 and measurement array 820. Each array of the measurement device 800 (i.e., excitation array 810, movable guard shading array 830 and measurement array 820) has a plurality of elements or conductive areas formed in a square wave pattern.

Excitation array 810 is the electrically driven element of the measurement device 800 that provides a sinusoidal signal to measurement array 820. Emitter A and emitter B, elements of excitation array 810, emit sine signals that are 180 degrees out-of-phase.

Movable guard shading array 820 is a conductive element of the measurement device 800 used as a shadowing element to block the electrostatic field generated by excitation array 810. Arrows 834 indicate the side-to-side motion of movable guard shading array 830 in the desired axis of measurement. For position determination, movable guard shading array 830 is mechanically coupled to a moving part whose motion is being measured. Movable guard shading array 830 is electrically driven by elements C' and D', which represent low impedance sources precisely matched to the signals appearing on nodes C and D of stationary measurement array 820. Buffer amplifiers are connected to nodes C and D of stationary measurement array 820 to drive the C' and D' signals, respectively.

In an alternative embodiment (not shown), movable guard shading array 830 may be floating or grounded, rather than being driven by nodes C' and D'.

Stationary measurement array 820 senses a signal from stationary excitation array 810, which is transferred by a capacitive coupling across the gap between the two arrays. The elements of measurement array 820 include detector C and detector D. Similar to the embodiment of FIG. 6, elements A and B of the excitation array 810 emit a signal that is sensed by stationary measurement array 820, the signals being out of phase from one another. The position of movable guard shading array 830 determines the signal received by detectors C and D of stationary measurement array 820. In addition, as described above, the signal sensed by detectors C and D is also used to drive the movable guard shading array 830 (e.g., nodes C' and D') representing low impedance sources precisely matched to the signals appearing on nodes C and D.

Figure 9:
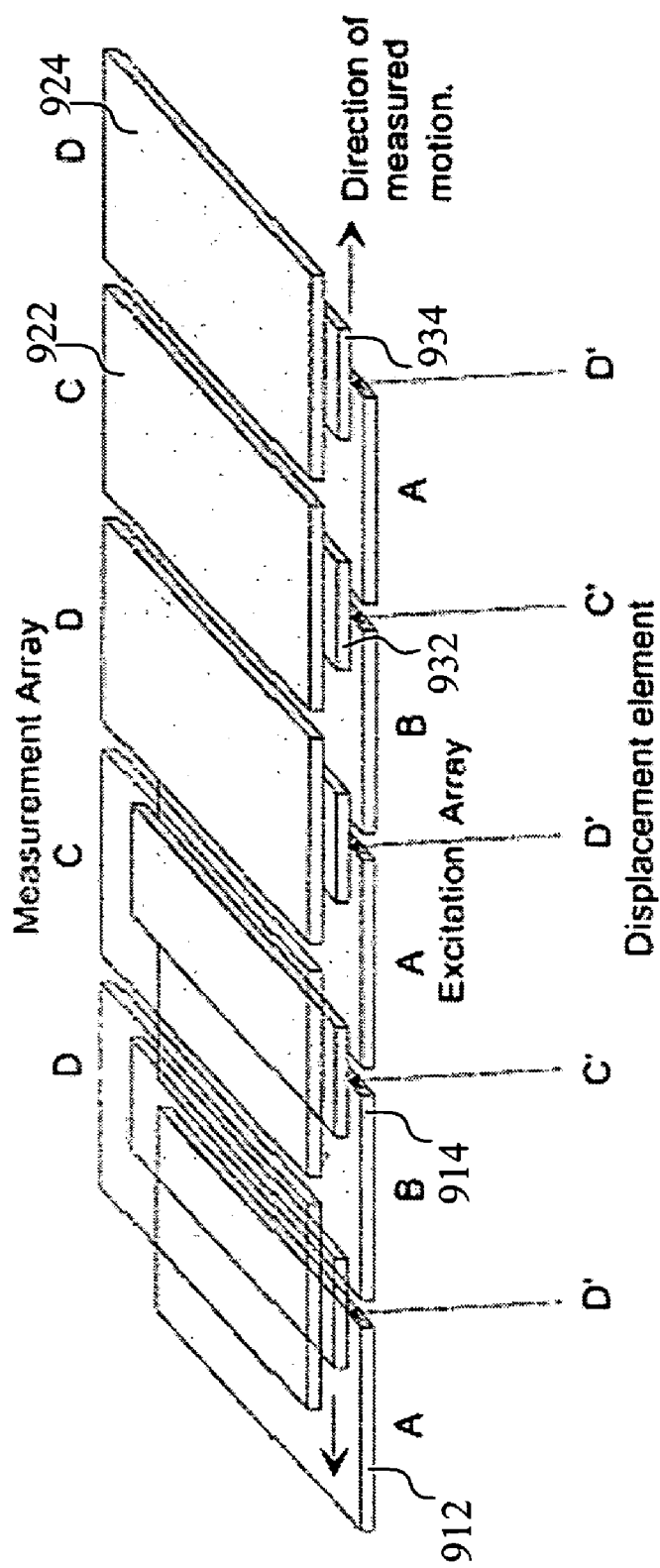
FIG. 9 is a cutaway view of a small portion of a measurement device according to the third preferred embodiment of the present invention.

FIG. 9 is a cutaway view of a small portion of measurement device 800 according to the third embodiment of the present invention. Stationary excitation array 810 comprises emitter A 912 and emitter B 914, stationary measurement array 820 comprises detector C 922 and detector D 924, and movable guard shading array 830 comprises displacement elements C' 932 and D' 934. Elements C' 932 and D' 934 are placed below the center of nodes C 922 and D 924, respectively.

Figure 10:
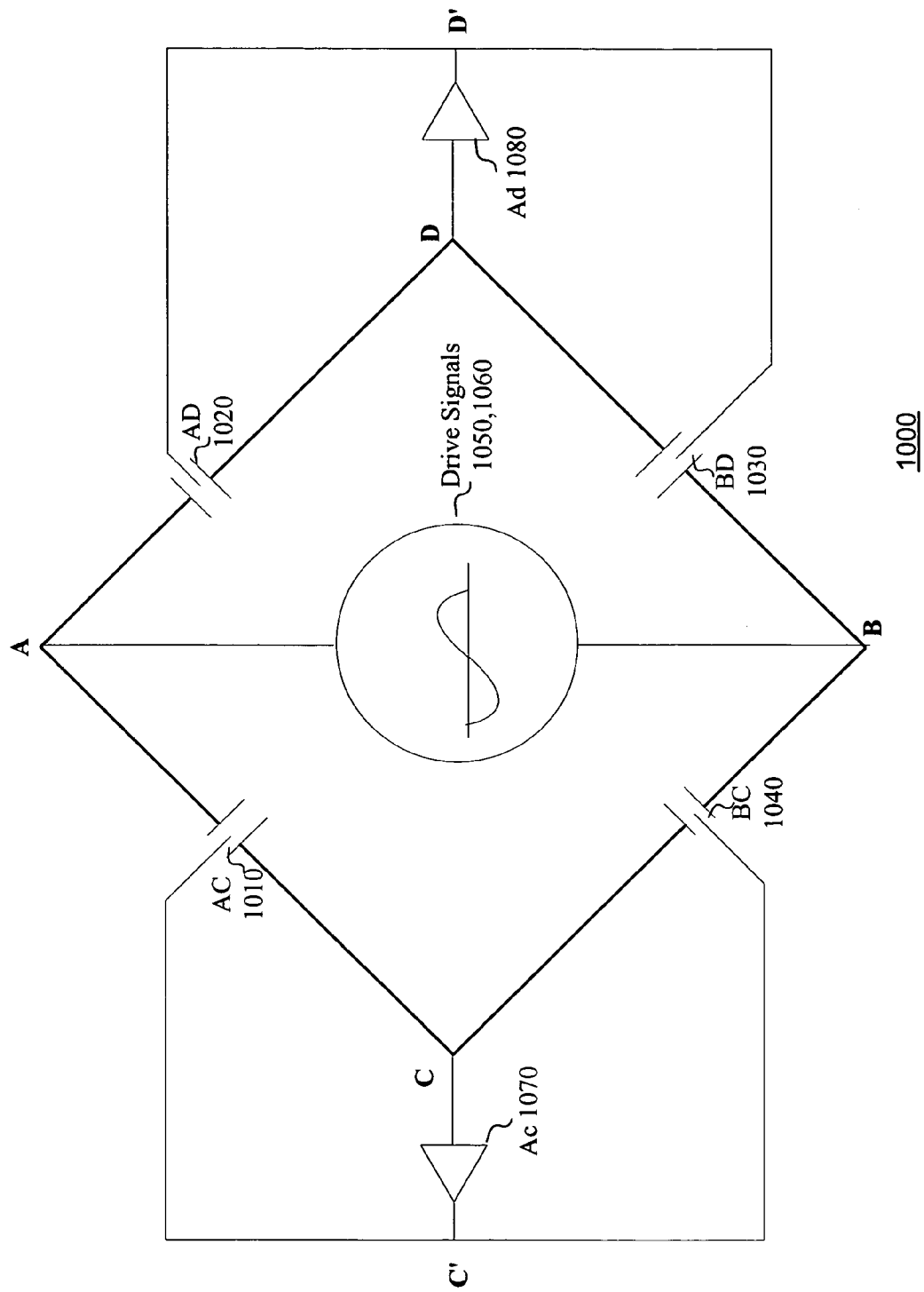
FIG. 10 is a schematic diagram of a capacitive bridge formed by the elements of the measurement device according to the third preferred embodiment of the present invention.

FIG. 10 is a schematic diagram of a capacitive bridge 1000 formed by the elements of measurement device 800 according to the third preferred embodiment of the present invention. Capacitive bridge 1000 includes variable capacitors AC 1010, AD 1020, BD 1030 and BC 1040. Sinusoidal drive signals 1050, 1060 (being 180 degrees out of phase from each other) are emitted from emitter A 912 and emitter B 914, respectively (see FIG. 9). Both signals 1050, 1060 are detected at detector C 922 and detector D 924. Buffer amplifier Ac 1070 is connected to node C 922 and drives displacement element C' 932. Similarly, buffer amplifier Ad 1080 is connected to node D 924 and drives displacement element D' 934.

Because nodes A, B, C' and D' are low impedance sources, any change in parasitic capacitances AC', AD', BC' and BD' will leave nodes A, B, C' and D' relatively unaffected. Parasitic capacitances CD' and DC' are minimized by the placement of C' and D' in the center below detectors C and D, respectively.

Because nodes D' and D have the same potential at all times, parasitic capacitance DD' is effectively zero. The same protection exists between nodes C and C', resulting in a zero capacitance. The effective zero value for capacitors DD' and CC' is not changed in any way by the gap between the two electrodes. Because these capacitances are normally the source of gain errors in the bridge, this source of error is effectively eliminated from the measurement. This technique is typically referred to as an electrostatic guarding technique.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A capacitive rotation angle sensor for measuring a small angle displacement of an object, comprising:
   an excitation array having a plurality of first emitters and a plurality of second emitters, the plurality of first emitters emitting a first sinusoidal signal, and the plurality of second emitters emitting a second sinusoidal signal, the second sinusoidal signal being out of phase with the first sinusoidal signal;
   a measurement array for measuring a position of the object arranged opposite to the excitation array and having a plurality of first detectors and a plurality of second detectors, the plurality of first detectors sensing a first voltage of the first sinusoidal signal and the second sinusoidal signal, and the plurality of second detectors sensing a second voltage of the first sinusoidal signal and the second sinusoidal signal; and
   an active rotor array which is adapted to be mechanically coupled to the object and rotationally moved between the excitation array and the measurement array, the active rotor array having a plurality of movable electrodes, wherein movement of the plurality of movable electrodes varies the first voltage and the second voltage sensed by the measurement array,
   wherein the capacitive rotation angle sensor measures a small angle displacement.

2. The capacitive rotation angle sensor of claim 1, wherein the excitation array comprises 20 or more emitters, the active rotor array comprises 20 or more movable electrodes, and the measurement array comprises 20 or more detectors, thereby forming 10 or more capacitive bridges.

3. The capacitive rotation angle sensor of claim 1, wherein the excitation array, the active rotor array, and the measurement array are formed using printed circuit board techniques.

4. The capacitive rotation angle sensor of claim 1, wherein the excitation array, the active array, and the measurement array are formed using a thin-film fabrication method to achieve high density.

5. The capacitive rotation angle sensor of claim 1, wherein the excitation array, the measurement array and the active rotor array are in the form of plates, each plate comprising a plurality of blades.

6. The capacitive rotation angle sensor of claim 1, wherein the plurality of movable electrodes is one of floating and grounded electrically.

7. The capacitive rotation angle sensor of claim 1, wherein the active rotor array comprises a plurality of first moving electrodes and a plurality of second moving electrodes, the plurality of first moving electrodes being driven by the first voltage and the plurality of second moving electrodes being driven by the second voltage.

8. The capacitive rotation angle sensor of claim 1, wherein the sensor has a maximum range of plus or minus 20 milliradians.

9. A method for measuring a small angle displacement of an object, comprising:
   emitting a first sinusoidal signal from one of a plurality of first emitters of an excitation array;
   emitting a second sinusoidal signal from one of a plurality of second emitters of the excitation array, the second sinusoidal signal being out of phase with the first sinusoidal signal;
   sensing a first voltage of the first and second sinusoidal signals at a first detector of a plurality of first detectors in a measurement array, the measurement array being arranged opposite to the excitation array;
   sensing a second voltage of the first and second sinusoidal signals at a second detector of a plurality of second detectors in the measurement array;
   rotationally moving an active rotor array, which is adapted to be mechanically coupled to the object, between the excitation array and the measurement array, the active rotor array having a plurality of movable electrodes, wherein movement of the plurality of movable electrodes varies the first voltage and the second voltage sensed by the measurement array; and
   determining a position of the active rotor array from the first and second voltages,
   wherein the position determined is a small angle displacement of the object.

10. The method of claim 9, wherein the excitation array comprises 20 or more emitters, the active rotor array comprises 20 or more movable electrodes, and the measurement array comprises 20 or more detectors, thereby forming 10 or more capacitive bridges.

11. The method of claim 9, wherein the excitation array, the active rotor array, and the measurement array are formed using printed circuit board techniques.

12. The method of claim 9, wherein the excitation array, the active rotor array, and the measurement array are formed using a thin-film fabrication method.

13. The method of claim 9, wherein the excitation array, the measurement array and the active rotor array are in the form of plates, each plate comprising a plurality of blades.

14. The method of claim 9, wherein each movable electrode of the plurality of movable electrodes is one of floating and grounded electrically.

15. The method of claim 9, wherein the active rotor array comprises a plurality of first moving electrodes and a plurality of second moving electrodes, the plurality of first moving electrodes being driven by the first voltage and the plurality of second moving electrodes being driven by the second voltage.

16. The method of claim 9, wherein the sensor has a maximum range of plus or minus 20 milliradians.

17. An apparatus for measuring a small angle displacement of an object, comprising:
   means for emitting a first sinusoidal signal from one of a plurality of first emitters of an excitation array;
   means for emitting a second sinusoidal signal from one of a plurality of second emitters of the excitation array, the second sinusoidal signal being out of phase with the first sinusoidal signal;
   means for sensing a first voltage of the first and second sinusoidal signals at a first detector of a plurality of first detectors in a measurement array, the measurement array being arranged opposite to the excitation array;
   means for sensing a second voltage of the first and second sinusoidal signals at a second detector of a plurality of second detectors in the measurement array;
   means for rotationally moving an active rotor array, which is adapted to be mechanically coupled to the object, between the excitation array and the measurement array, the active rotor array having a plurality of movable electrodes, wherein movement of the plurality of movable electrodes varies the first voltage and the second voltage sensed by the measurement array; and
   means for determining a position of the moving object from the first and second voltages,
   wherein the position determined is a small angle displacement of the object.

18. The apparatus of claim 17, wherein the excitation array comprises 20 or more emitters, the active rotor array comprises 20 or more movable electrodes, and the measurement array comprises 20 or more detectors, thereby forming 10 or more capacitive bridges.

19. The apparatus of claim 17, wherein the excitation array, the active rotor array, and the measurement array are formed using printed circuit board techniques.

20. The apparatus of claim 17, wherein the excitation array, the active rotor array, and the measurement array are formed using a thin-film fabrication method.

21. The apparatus of claim 17, wherein the excitation array, the measurement array and the active rotor array are in the form of plates, each plate comprising a plurality of blades.

22. The apparatus of claim 17, wherein the plurality of moving electrodes is one of floating and grounded electrically.

23. The apparatus of claim 17, wherein the active rotor array comprises a plurality of first moving electrodes and a plurality of second moving electrodes, the plurality of first moving electrodes being driven by the first voltage and the plurality of second moving electrodes being driven by the second voltage.

24. A capacitive measurement sensor, comprising:
   an excitation array having a plurality of first emitters and a plurality of second emitters, the plurality of first emitters emitting a first sinusoidal signal, and the plurality of second emitters emitting a second sinusoidal signal, the second sinusoidal signal being out of phase with the first sinusoidal signal;
   a measurement array arranged opposite to the excitation array and having a plurality of first detectors and a plurality of second detectors, the plurality of first detectors sensing a first voltage of the first sinusoidal signal and the second sinusoidal signal, and the plurality of second detectors sensing a second voltage of the first sinusoidal signal and the second sinusoidal signal; and
   a movable array that is adapted to be mechanically coupled to a moving object whose motion is to be measured and is moved between the excitation array and the measurement array, the movable array having a plurality of movable electrodes, wherein movement of the plurality of movable electrodes varies the first voltage and the second voltage sensed by the measurement array and the measurement array determines a position of the moving object using the first and second voltages,
   wherein the capacitive measurement sensor measures a small displacement.

25. The capacitive measurement sensor of claim 24, wherein the capacitive measurement sensor is an angle sensor and the movable array is a rotor array.

26. The capacitive measurement sensor of claim 24, wherein the capacitive measurement sensor is a linear displacement sensor and the movable array is a linear array.

27. The capacitive measurement sensor of claim 24, wherein the excitation array comprises 20 or more emitters, the movable array comprises 20 or more movable electrodes, and the measurement array comprises 20 or more detectors, thereby forming 10 or more capacitive bridges.

28. The capacitive measurement sensor of claim 24, wherein the excitation array, the movable array, and the measurement array are formed using printed circuit board techniques.

29. The capacitive measurement sensor of claim 24, wherein the excitation array, the movable array, and the measurement array are formed using a thin-film fabrication method.

30. The capacitive measurement sensor of claim 24, wherein the excitation array, the measurement array and the movable array are in the form of plates, each plate comprising a plurality of blades.

31. The capacitive measurement sensor of claim 24, wherein the plurality of movable electrodes is one of floating and grounded electrically.

32. The capacitive measurement sensor of claim 24, wherein the movable array comprises a plurality of first moving electrodes and a plurality of second moving electrodes, the plurality of first moving electrodes being driven by the first voltage and the plurality of second moving electrodes being driven by the second voltage.

33. The capacitive measurement sensor of claim 24, wherein the capacitive measurement sensor is a component of a rheometric apparatus.

34. A capacitive rotation angle sensor for measuring a small angle displacement of an object, comprising:
an excitation array having a first emitter and a second emitter, the first emitter emitting a first sinusoidal signal, and the second emitter emitting a second sinusoidal signal, the second sinusoidal signal being out of phase with the first sinusoidal signal;
a measurement array arranged opposite to the excitation array and having a first detector and a second detector, the first detector sensing a first voltage of the first and second sinusoidal signals, and the second detector sensing a second voltage of the first and second sinusoidal signals; and
an active rotor array that is adapted to be mechanically coupled to the object and rotationally moved between the excitation array and the measurement array, the active rotor array having a first movable electrode driven by the first voltage and a second movable electrode driven by the second voltage,
wherein movement of the active rotor array varies the first voltage and the second voltage sensed by the measurement array and the measurement array determines a position of the moving object from the first and second voltages,
wherein the capacitive rotation angle sensor measures a small angle displacement.

35. The capacitive rotor angle sensor of claim 34, wherein the excitation array further comprises a plurality of first emitters and a plurality of second emitters,
wherein the active rotor array comprises a plurality of first movable elements and a plurality of second movable elements, and the measurement array comprises a plurality of first detector elements and a plurality of second detector elements.

36. The capacitive rotation angle sensor of claim 34, wherein the excitation array comprises 20 or more emitters, the active rotor array comprises 20 or more movable electrodes, and the measurement array comprises 20 or more detectors, thereby forming 10 or more capacitive bridges.

37. The capacitive rotation angle sensor of claim 34, wherein the excitation array, the active rotor array, and the measurement array are formed using printed circuit board techniques.

38. The capacitive rotation angle sensor of claim 34, wherein the excitation array, the active rotor array, and the measurement array are formed using a thin-film fabrication method to achieve high density.

39. The capacitive rotation angle sensor of claim 34, wherein the excitation array, the measurement array and the active rotor array are in the form of plates, each plate comprising a plurality of blades.

40. The capacitive rotation angle sensor of claim 34, wherein the sensor has a maximum range of plus or minus 20 milliradians.

41. A capacitive motion sensor for sensing the position of a moving object, comprising:
an excitation array having a plurality of first emitters and a plurality of second emitters, the plurality of first emitters emitting a first sinusoidal signal, and the plurality of second emitters emitting a second sinusoidal signal, the second sinusoidal signal being out of phase with the first sinusoidal signal;
a measurement array arranged opposite to the excitation array and having a plurality of first detectors and a plurality of second detectors, the plurality of first detectors sensing a first voltage of the first and second sinusoidal signals and the plurality of second detectors sensing a second voltage of the first and second sinusoidal signals; and
a movable guard shading array coupled to the moving object and moved between the excitation array and the measurement array, the movable guard array having a plurality of first movable elements and a plurality of second movable elements, the plurality of first movable elements being driven by the first voltage and the plurality of second movable elements being driven by the second movable element,
wherein movement of the movable guard shading array varies the first and second voltages and the measurement array determines a position of the moving object from the first and second voltages,
wherein the capacitive motion sensor measures a small displacement.

42. The capacitive motion sensor of claim 41, wherein the capacitive motion sensor is an angle sensor for measuring a small angle and the movable guard shading array is an active rotor array.

43. The capacitive motion sensor of claim 41, wherein the capacitive motion sensor is a linear sensor for measuring small displacement and the movable guard shading array is a linear array.

44. The capacitive motion sensor of claim 41, wherein the excitation array, the movable guard shading array, and the measurement array are formed using printed circuit board techniques.

45. The capacitive motion sensor of claim 41, wherein the excitation array, the movable guard shading array, and the measurement array are formed using a thin-film fabrication method.

46. The capacitive motion sensor of claim 41, wherein the excitation array, the measurement array and the movable guard shading array are in the form of plates.

47. A method for measuring a small angle displacement of an object, comprising:
emitting a first sinusoidal signal from a first emitter of an excitation array;
emitting a second sinusoidal signal from a second emitter of the excitation array, the second sinusoidal signal being out of phase with the first sinusoidal signal;
sensing a first voltage of the first and second sinusoidal signals at a first detector in a measurement array, the measurement array being arranged opposite to the excitation array
sensing a second voltage of the first and second sinusoidal signals at a second detector in the measurement array;
rotationally moving an active rotor array, which is adapted to be mechanically coupled to the object, between the excitation array and the measurement array, the active rotor array having a first movable electrode and a second movable electrode, wherein movement of the first and second movable electrodes varies the first voltage and the second voltage sensed by the measurement array and the measurement array determines the small angle displacement of the object from the first and second voltages;
driving the first movable electrode by the first voltage; and
driving the second movable electrode with the second voltage.

48. The method of claim 47, wherein the excitation array further comprises a plurality of first emitters and a plurality of second emitters,
wherein the active rotor array comprises a plurality of first movable electrodes and a plurality of second movable electrodes, and
the measurement array comprises a plurality of first detector elements and a plurality of second detector elements.

49. The method of claim 47, wherein the excitation array comprises 20 or more emitters, the active rotor array comprises 20 or more movable electrodes, and the measurement array comprises 20 or more detectors.

50. The method of claim 47, wherein the excitation array, the active rotor array, and the measurement array are formed using printed circuit board techniques.

51. The method of claim 47, wherein the excitation array, the active rotor array, and the measurement array are formed using a thin-film fabrication method.

52. The method of claim 47, wherein the excitation array, the measurement array and the active rotor array are in the form of plates, each plate comprising a plurality of blades.

53. A capacitive rotation angle sensor for measuring a small angle displacement of an object, comprising:
means for emitting a first sinusoidal signal from a first emitter of an excitation array;
means for emitting a second sinusoidal signal from a second emitter of the excitation array, the second sinusoidal signal being out of phase with the first sinusoidal signal;
means for sensing a first voltage of the first and second sinusoidal signals at a first detector in a measurement array, the measurement array being arranged opposite to the excitation array;
means for sensing a second voltage of the first and second sinusoidal signals at a second detector in the measurement array;
means for rotationally moving an active rotor array, which is adapted to be mechanically coupled to the object, between the excitation array and the measurement array, the active rotor array having a first movable electrode and a second movable electrode, wherein movement of the first and second movable electrodes varies the first voltage and the second voltage sensed by the measurement array;
means for determining the small angle displacement of the object from the first and second voltages;
means for driving the first movable electrode by the first voltage; and
means for driving the second movable electrode with the second voltage.

54. The capacitive rotor angle sensor of 53, wherein the excitation array comprises a plurality of first emitters and a plurality of second emitters,
wherein the active rotor array comprises a plurality of first movable elements and a plurality of second movable elements, and
the measurement array comprises a plurality of first detector elements and a plurality of second detector elements.

55. The capacitive rotation angle sensor of claim 53, wherein the excitation array comprises 20 or more emitters, the active rotor array comprises 20 or more movable electrodes, and the measurement array comprises 20 or more detectors.

56. The capacitive rotation angle sensor of claim 53, wherein the excitation array, the active rotor array, and the measurement array are formed using printed circuit board techniques.

57. The capacitive rotation angle sensor of claim 53, wherein the excitation array, the active rotor array, and the measurement array are formed using a thin-film fabrication method to achieve high density.

58. The capacitive rotation angle sensor of claim 53, wherein the excitation array, the measurement array and the active rotor array are in the form of plates, each plate comprising a plurality of blades.

59. The capacitive rotation angle sensor of claim 53, wherein the sensor has a maximum range of plus or minus 20 milliradians.

60. A capacitive measurement sensor comprising:
an excitation array having a first emitter and a second emitter, the first emitter emitting a first sinusoidal signal, and the second emitter emitting a second sinusoidal signal, the second sinusoidal signal being out of phase with the first sinusoidal signal;
a measurement array arranged opposite to the excitation array and having a first detector and a second detector, the first detector sensing a first voltage of the first and second sinusoidal signals, and the second detector sensing a second voltage of the first and second sinusoidal signals; and
a movable array that is adapted to be mechanically coupled to a moving object and moved between the excitation array and the measurement array, the movable array having a first movable electrode driven by the first voltage and a second movable electrode driven by the second voltage, wherein movement of the active rotor array varies the first voltage and the second voltage sensed by the measurement array and the measurement array determines a position of the moving object from the first and second voltages, wherein the position determined is a small displacement of the object.

61. The capacitive measurement sensor of claim 60, wherein the excitation array further comprises a plurality of first emitters and a plurality of second emitters, wherein the movable array comprises a plurality of first movable elements and a plurality of second movable elements, and the measurement array comprises a plurality of first detector elements and a plurality of second detector elements.

62. The capacitive measurement sensor of claim 60, wherein the capacitive measurement sensor is an angle sensor and the movable array is a rotor array.

63. The capacitive measurement sensor of claim 60, wherein the capacitive measurement sensor is a linear displacement sensor and the movable array is a linear array.

64. The capacitive measurement sensor of claim 60, wherein the excitation array, the movable array, and the measurement array are formed using printed circuit board techniques.

65. The capacitive measurement sensor of claim 60, wherein the excitation array, the movable array, and the measurement array are formed using a thin-film fabrication method.

66. The capacitive measurement sensor of claim 60, wherein said excitation array, said measurement array and said movable array are in the form of plates, each plate comprising a plurality of blades.

67. The capacitive measurement sensor of claim 60, wherein the movable array comprises a plurality of first moving electrodes and a plurality of second moving electrodes, the plurality of first moving electrodes being driven by the first voltage and the plurality of second moving electrodes being driven by the second voltage.

68. The capacitive measurement sensor of claim 60, wherein the capacitive measurement sensor is a component of a rheometric apparatus.

69. The capacitive measurement sensor of claim 60, wherein the excitation array comprises 20 or more emitters, the movable array comprises 20 or more movable electrodes, and the measurement array comprises 20 or more detectors.

70. The capacitive rotation angle sensor of claim 1, wherein the sensor measures angles of 7 degrees or less.

* * * * *